(12) United States Patent
Bordes et al.

(10) Patent No.: US 9,870,606 B2
(45) Date of Patent: Jan. 16, 2018

(54) METHOD AND APPARATUS FOR COMPENSATING ILLUMINATION VARIATIONS IN A SEQUENCE OF IMAGES

(71) Applicant: THOMSON LICENSING, Issy de Moulineaux (FR)

(72) Inventors: Philippe Bordes, Laille (FR); Yannick Olivier, Thorigne Fouillard (FR); David Touze, Rennes (FR); Franck Hiron, Chateaubourg (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/429,033

(22) PCT Filed: Aug. 27, 2013

(86) PCT No.: PCT/EP2013/067719
§ 371 (c)(1),
(2) Date: Mar. 18, 2015

(87) PCT Pub. No.: WO2014/044504
PCT Pub. Date: Mar. 27, 2014

(65) Prior Publication Data
US 2015/0248746 A1 Sep. 3, 2015

(30) Foreign Application Priority Data
Sep. 19, 2012 (EP) .................................. 12306132

(51) Int. Cl.
*G06K 9/00* (2006.01)
*G06T 5/00* (2006.01)
(Continued)

(52) U.S. Cl.
CPC ................ *G06T 5/008* (2013.01); *G06T 5/40* (2013.01); *H04N 19/117* (2014.11);
(Continued)

(58) Field of Classification Search
CPC .... H04N 19/597; H04N 19/176; H04N 19/52; H04N 1/4074; G06T 5/40; G06T 2207/10016
See application file for complete search history.

(56) References Cited

U.S. PATENT DOCUMENTS

2002/0196849 A1  12/2002  Kamikura et al.
2004/0057523 A1   3/2004  Koto et al.
(Continued)

FOREIGN PATENT DOCUMENTS

CN   101715652 A   5/2010
CN   101785317 A   7/2010
(Continued)

OTHER PUBLICATIONS

Qiam et al: "Effective Fades and Flashlight Detection Based on Accumulating Histogram Difference";IEEE Transactions on Circuits and Systems for Video Technology, IEEE Service Center, vol. 16 n° 1001; Oct. 2006 (Oct. 1, 2006), pp. 1245-1258.
(Continued)

*Primary Examiner* — Li Liu
(74) *Attorney, Agent, or Firm* — Tutunjian & Bitetto, P.C.

(57) ABSTRACT

In order to take into account the local illumination variations in a scene, the invention proposes a method of compensating illumination variations in which distributions are determined for each block of an image (or view) and, in order to avoid a loss of the video coding efficiency, a distribution-based mapping function is automatically computed by a remote apparatus, such a decoder, from only information available at that apparatus when decoding a current block of the sequence of images. The present invention relates also to a method and device of encoding and/or decoding a sequence
(Continued)

of images which comprises means configured to implement the method of compensating illumination variations according to the invention.

11 Claims, 4 Drawing Sheets

(51) Int. Cl.

| | | |
|---|---|---|
| *G06T 5/40* | (2006.01) | |
| *H04N 19/597* | (2014.01) | |
| *H04N 19/139* | (2014.01) | |
| *H04N 19/176* | (2014.01) | |
| *H04N 19/46* | (2014.01) | |
| *H04N 19/51* | (2014.01) | |
| *H04N 19/196* | (2014.01) | |
| *H04N 19/117* | (2014.01) | |
| *H04N 19/14* | (2014.01) | |

(52) U.S. Cl.
CPC .......... *H04N 19/139* (2014.11); *H04N 19/14* (2014.11); *H04N 19/176* (2014.11); *H04N 19/196* (2014.11); *H04N 19/46* (2014.11); *H04N 19/51* (2014.11); *H04N 19/597* (2014.11); *G06T 2207/10016* (2013.01)

(56) References Cited

U.S. PATENT DOCUMENTS

| | | | | |
|---|---|---|---|---|
| 2009/0010340 A1* | 1/2009 | Joung | ................. | H04N 19/597 375/240.24 |
| 2010/0158129 A1 | 6/2010 | Lai et al. | | |
| 2011/0150329 A1* | 6/2011 | Lepine | ................. | G06T 3/4038 382/165 |
| 2011/0249890 A1* | 10/2011 | Kim | ........................ | G06T 5/009 382/162 |
| 2013/0163666 A1* | 6/2013 | Leontaris | ......... | H04N 19/00569 375/240.12 |
| 2014/0307129 A1* | 10/2014 | Feng | ..................... | H04N 5/2173 348/242 |
| 2015/0195569 A1* | 7/2015 | Jung | .................... | H04N 19/597 375/240.16 |

FOREIGN PATENT DOCUMENTS

| | | |
|---|---|---|
| EP | 0671706 | 9/1995 |
| FR | 2966681 | 4/2012 |
| JP | 2008514122 A | 5/2008 |
| KR | 2007083168 | 8/2007 |
| KR | 794909 | 1/2008 |
| WO | 2004064255 A2 | 6/2004 |
| WO | 2006033953 A1 | 3/2006 |
| WO | WO2009002092 | 12/2008 |
| WO | WO2009023091 | 2/2009 |

OTHER PUBLICATIONS

Yamamoto et al: "Multiview Video Coding Using View Interpolation and Color Correction"; IEEE Transactions on Circuits and Systems for Video Technology, IEEE Service Center, vol. 17 n°1101 Nov. 2007 (Nov. 1, 2007), pp. 1436-1449.
Shen et al: "Adaptative weighted prediction in video coding"; 2004 IEEE International Conference on Multimedia and Expo: Jun. 27-30, 2004, IEEE Operations Center, vol. , Jun. 27, 2004 (Jun. 27, 2004), pp. 427-430.
Lopez et al: "Block-based illumination Compensation and Search Techniques for Multiview Coding"; Proceedings of the Picture Coding Symposium, XX, XX15 Dec. 2004 (Dec. 15, 2004)pp. 1-6.
Chen et al: "Histogram-Offset-Based Color Correction for Multi-View Video Coding"; Temasek Las., Nanyang Technol. Univ., Singapore / Sch. of Electr. Eng., Nanyang Technol. Univ., Singapore/ Inst. of Inf. Sci. & Technol., Huaqiao Univ., Quanzhou; 2010 Proceedings of 17th IEEE International Conference on Image Processing (ICIP 2010); IEEE; Sep. 16-29, 2010, pp. 977-980.
Fecker et al: "Istogram-Based Prefiltering for Luminance and Chrominance Compensation of Multiview Video"; Univ Erlangen Nurnberg / Chair Multimedia Commun & Signal Proc; IEEE Transactions on Circuits and Systems for VIdeo Technology / vol. 18 No. 9; pp. 1258-1267; Sep. 2008.
Chen et al: "Fast Luminance and Chrominance Correction Based on Motion Compensated Linear Regression for Multi-View Video Coding"; Dept. of Electr. Eng., Nat. Taiwan Univ., Taipei Proceedings of the SPIE—The International Society for Optical Engineering SPIE; pp. 1-8, 2007.
Search Report Dated Dec. 4, 2013.
Wiegand, Thomas, "Text of Committee Draft of Joint Video Specification (ITU-T Rec. H.264, ISO/IEC 14496-10 AVC)," International Organization for Standardization ISO/IEC/JTC1/SC29/WG11, Jul. 2002, pp. i-132.

\* cited by examiner

METHOD AND APPARATUS FOR COMPENSATING ILLUMINATION VARIATIONS IN A SEQUENCE OF IMAGES

This application claims the benefit, under 35 U.S.C. §365 of International Application PCT/EP2013/067719, filed Aug. 27, 2013, which was published in accordance with PCT Article 21 (2) on Mar. 27, 2014 in English and which claims the benefit of European patent application No. 12306132.7, filed Sep. 19, 2012.

1. FIELD OF INVENTION

The present invention generally relates to the illumination compensation in a sequence of images. More precisely, it relates to a method and apparatus for compensating illumination variations in a sequence of images. It relates also to a method and device of coding and/or decoding a sequence of images which implements the method of compensating illumination variations of such a sequence of images.

2. TECHNICAL BACKGROUND

A sequence of images shall be considered in the following in a broad meaning because it covers a 3D video sequence, scalable video sequence, a multi-view video sequence, etc. . . . . Consequently, the claimed method may applied to any of kind of sequence of images the illumination variations of which shall be compensated from a reference image.

In a multi-view video sequence, for example, an object or a scene is recorded using a setup of several synchronous cameras from different positions. Each camera records an image which is usually called a view. A multi-view video sequence is thus composed of multiple scenes and several views are recorded for each scene. A view is a set of pixels as an image but the term 'view' is used in the following rather than the term 'image' to keep in mind that multiple views of a same scene (or object) are embedded in the sequence of images.

Frequently discussed applications for sequence of images include three-dimensional television (3DTV) as well as free-viewpoint television (FTV), where the user is able to navigate freely through the scene.

The recording of a sequence of images creates a large amount of data. Therefore, efficient compression techniques are required to store or transmit video streams.

For example, MVC (Multi-views Video Coding), specified by ISO/IEC 14496-10 ITU-T Rec. H.264, supports the direct coding of the synchronous information from multiple views using a single stream and exploits inter-camera redundancy to reduce the bit rate. The basic coding scheme uses the hierarchical B prediction structure for each view. This scheme utilizes the correlation between images at the same time point but different views for disparity estimation and compensation. Motion compensation techniques that are well-developed for single-view video compression can be used for temporal prediction. Likewise, disparity compensation techniques can be utilized to reduce inter-view redundancies. The compensation process is fulfilled by block matching technique, generally aiming to find the best matching block in the reference image, so that it contributes to minimum residual error after prediction.

There exists illumination change between multiple views of a same scene (or object). Such a change can be classified into two categories: the global illumination change, which is caused by different calibrations between cameras, and the local illumination change, which is caused by the different angles and positions of the cameras.

The reason why the problem has to be dealt with is that it may influence the quality of the image-based rendering algorithms or the accuracy of the disparity estimation and compensation (inter-view prediction in case of video coding). In the last case, the amount of residual energy for the best match candidate will be increased. Furthermore, the searching process for best matching block and the disparity vector will be affected. Both of those further results in decreasing the coding efficiency.

This is also the case for the inter-view matching for depth estimation (3D video) or for the bit-depth scalable video coding or for predicting HDR (High Dynamic Range) videos from LDR (Low Dynamic Range) videos.

To solve this problem, MVC implements an illumination compensation process which uses a weighting prediction tool. The illumination compensation process which predicts a view D from reconstructed samples $Rec_R(.,.)$ of another view R, is given by equation (1):

$$Pred_D(x,y) = W_R \times Rec_R(x+dx, y+dy) + O_R \quad (1)$$

where $W_R$ and $O_R$, are the scaling parameter and offset respectively, which are, in a transmission context, transmitted in a slice header relative to the current view D of the sequence of images. The scaling parameter and the offset are constant for the whole slice.

Such an illumination compensation process, which is linear, is too simple in case of light reflections or flashes for multi-view video coding. Moreover, it does not take into account the local illumination variations in a scene because the same parameters are applied for the whole slice.

The illumination compensation linear process is definitely not adapted in the case of views from heterogeneous captors, e.g. bracketing, or for heterogeneous scalable prediction, e.g. HDR (High Dynamic Range) to LDR (Low Dynamic Range) video conversion.

Fecker et al. ("Histogram-based prefiltering for luminance and chrominance compensation of multiview video", IEEE, Transactions on circuits and systems for video technology, vol. 18, NO. 9, September 2008) design a cumulative-histogram-based matching process for illumination compensation. Such a cumulative histogram based process for illumination compensation applies the same correction to the entire view, it is especially useful to correct global discrepancies in the luminance and the chrominance. However, such a process for illumination compensation does not take into account the local illumination variations in the scene because the histograms are calculated for the entire view.

In order to take into account the local illumination variations in the scene, the matching process for illumination compensation should be adapted locally. However, if the adaptation is made per block, for instance, one should transmit a matching information per block. This huge amount of information is not efficient for video coding.

3. SUMMARY OF THE INVENTION

The present invention aims at alleviating some of the inconveniences of prior art.

In order to take into account the local illumination variations in the scene, the invention proposes a method of compensating illumination variations in which distributions are calculated for each block of an image (or view) and, in order to avoid a loss of the video coding efficiency, a distribution-based mapping function is automatically computed by a remote apparatus, such a decoder, from only information available at that apparatus when decoding a current block of the sequence of images.

The invention relates to a method of compensating illumination variations in a sequence of images, characterized in that, for each current block of a current image, determining a mapping function between the pixel values of said block of the current image and the pixel values of a block (Rk) of a reference image of the sequence of images by matching a distribution over a causal region of said block (Dk) of the current image and a distribution over a causal region of said block of the reference image.

In a multi-view video sequence encoding/decoding scheme, the mapping function adapts the distribution of a region of a block of a current view of a scene to the distribution of a region of a block of a reference view of that scene. Thus, if all camera views of a scene are adapted to a common reference view of that scene using distribution matching, the inter-view prediction across camera views for that scene is improved leading to an increase of the coding efficiency of the sequence of images.

Another advantage of this method is that no assumptions on the type of distortion like brightness or contrast variations are made and non linear operations may be considered.

The invention also relates to a method of coding and/or decoding a sequence of images computing a prediction block from a block of a reference image, characterized in that the prediction block is computed from a block of the reference image which is modified according to a method of compensating illumination variations which conforms to the invention.

The invention further relates to a signal frame which comprises information, between the pixel values of a block of a current image of a sequence of images and the pixel values of a block of a reference image which is relative to the block of the current image, obtained by matching two distributions, one determined over a causal region nearby said block of the current image and the other one over a causal region nearby said block of the reference image.

The invention also relates to an apparatus of compensating illumination variations in a sequence of images which comprises means configured to implement the above-cited method of compensating illumination variations.

The invention relates further to a device for coding and/or decoding a sequence of images which is characterized in that it comprises an apparatus above-described.

4. LIST OF FIGURES

More advantages of the invention will appear through the description of particular, non-restricting embodiments of the invention.

The embodiments will be described with reference to the following figures.

5. DETAILED DESCRIPTION OF THE INVENTION

Figure 1:
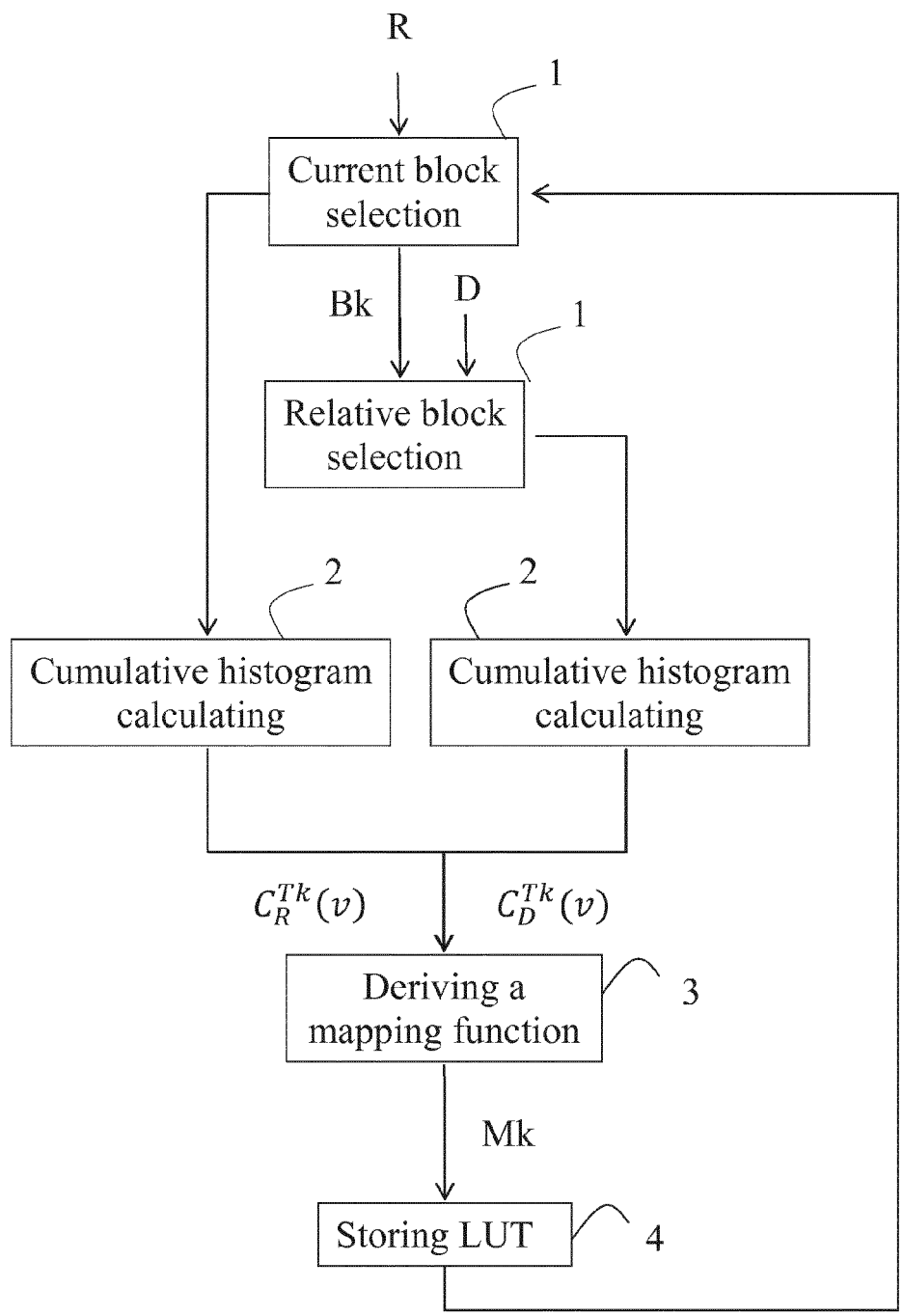
FIG. 1 shows the diagram of the method of compensating illumination variations in a sequence of images.

FIG. 1 shows the diagram of the method of compensating illumination variations in a sequence of images.

In the following, the term "pixel values" refer to the luminance values and/or to the chrominance values of pixels belonging to an image. Moreover, the invention is disclosed using the luminance values of pixels but the invention may also be applied to the chrominance components of these images. The term "cumulative histogram" is used only for illustrative purpose but the invention may be generalized to any other distribution. Next, the term 'block' means a set of pixels of an image which is smaller than the total number of pixels of that image. But the invention may also be applied to any other subset of pixels of an image such as a macro-block or coding unit for instance.

In the following, the invention is described in the case of a sequence of images but its scope extends to the compensation of illumination variations of any sequence of images such a multi-view video sequence, a 3D video or scalable video or HDR/LDR video. Thus, the device of encoding and/or decoding a sequence of images according to the invention covers also multi-view video encoding/decoding device in which the views of a same scene are compensated according to the invention, or a 3D video encoding/decoding device in which the illumination variations of the views used for the inter-view matching for depth estimation are compensated according to the invention. It also covers, for example, a bit-depth scalable video coding in which the illumination variations of images are compensated, and a device to compute a HDR (High Dynamic Range) video from a LDR (Low Dynamic Range) video. In the later case, the illumination variations of LDR images are compensated.

As a first step 1 of the method, a block of a current image of the sequence of images is selected. This block is called current block Dk in the following. Next, a block of a reference image of the sequence of images is selected. This block is called reference block Rk in the following. This reference block Rk is relative to the current block Dk. The reference block Rk may be, for example, the result of a block-matching process which consists in selecting in a reference image the block that minimizes a distortion calculated between this block and the current block Dk (to be predicted).

According to an embodiment, the current and reference images are the same image of the sequence of images (intra-coding case) and according to another embodiment they are two distinct images of the sequence of images (inter-coding case).

The amplitude of the luminance component of a reference block Rk and the amplitude of the luminance component of a current block Dk, is denoted by $y_R(m,n)$ and $y_D(m,n)$ respectively.

As a second step 2, a cumulative histogram $C_R^{Tk}(v)$ is calculated.

First, a histogram of the reference block Rk is determined as follows:

$$h_R^{Tk}(v) = \sum_{(m,n) \in Tk} \delta(v, y_R(m,n)) \text{ with } \delta(a,b) = \begin{cases} 1, & \text{if } a = b \\ 0, & \text{else} \end{cases} \quad (6)$$

where Tk denotes a neighborhood nearby the reference block Rk.

Next, the cumulative histogram $C_R^{Tk}(v)$ of the reference block Rk is determined by equation (7):

$$C_R^{Tk}(v) = \sum_{i=0}^{v} h_R^{Tk}(i) \quad (7)$$

The histogram $h_D^{Tk}(v)$ and the cumulative histogram $C_D^{Tk}(v)$ of the current block Dk are determined in the same manner from equations 6 and 7.

Next, as a third step 3, based on the cumulative histograms $C_R^{Tk}(v)$ and $C_D^{Tk}(v)$ a mapping function Mk is computed for the reference block Rk.

Figure 2:
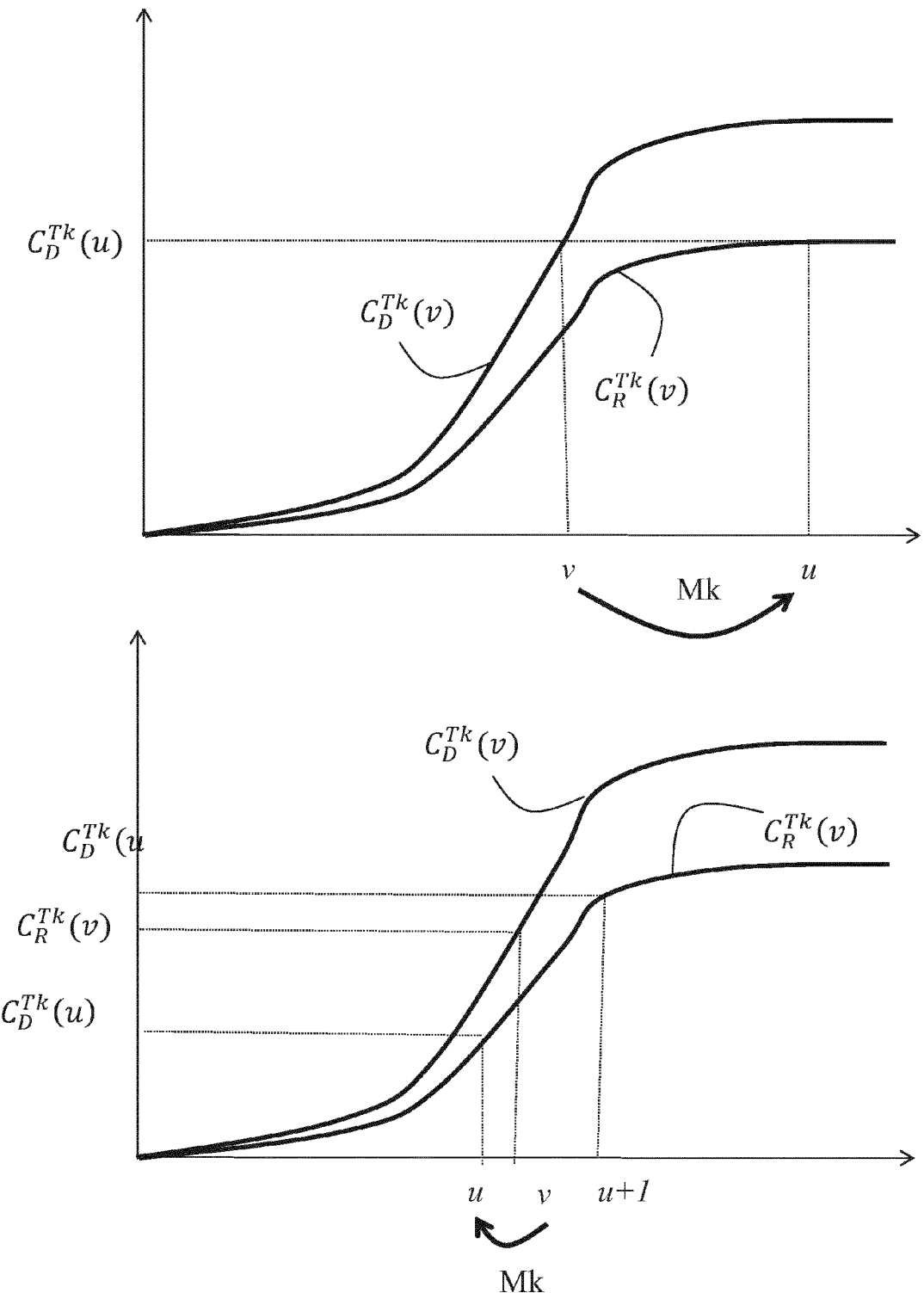
FIG. 2 illustrates examples of mapping functions between block of two images.

As illustrated in top of FIG. 2, the mapping is computed, for example, for a given number $C_D^{Tk}(u)$ of occurrences on the current block Dk by replacing the luminance value v relative to that given number of occurrences on the reference block Rk by a luminance value u of the current block Dk in order that the number $C_D^{Tk}(u)$ of occurrences on the current block Dk equals the number $C_R^{Tk}(v)$ of occurrences on the reference block Rk. In mathematical terms, the mapping is given by equation 8:

$$M_k(v)=u \text{ with } Mk(C_R^{Tk}(v))=C_D^{Tk}(u) \tag{8}$$

This example does not limit the scope of the invention which extends to any means to compute a mapping function from two distributions.

According to another example, the mapping is computed by matching the number of occurrences in the current block Dk to the number of occurrences in the reference block Rk as illustrated in bottom of FIG. 2. In mathematical terms, the mapping is given by equation 9:

$$Mk(v)=u \text{ with } C_D^{Tk}(u) \leq C_R^{Tk}(v) < C_D^{Tk}(u+1) \tag{9}$$

Once the mapping function of the reference block Rk has been computed, the mapping function Mk applies to the luminance values of the reference block Rk, resulting in a corrected luminance block used as prediction for coding the current block Dk, the luminance values $y_c(m,n)$ of which are given by:

$$y_c(m,n)=Mk(y_R(m,n)) \text{ with } (m,n) \in Tk \tag{10}$$

The previous steps iterate for any other current block Dk and the method ends when all the current blocks of the current image of the sequence of images have been considered.

According to an embodiment, the method further comprises a fourth step 4 in the course of which the mapping results Mk for a block Bk is stored in a look up table LUT.

Thus, for any luminance value of a pixel of the current block Bk predicted with the reference block Rk, a compensated illumination luminance value is found from the LUT thanks to the mapping functions Mk.

FIG. 3 shows some examples of causal neighborhood of a current block Bk of an image.

Figure 3A:
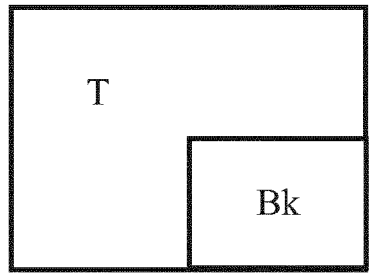
FIGS. 3a-3d show some examples of neighborhoods nearby a current block Bk of an image.

In FIG. 3a, the neighborhood T is define by three blocks, one located on top of the current block Bk, one on left and one on top-left.

Figure 3B:
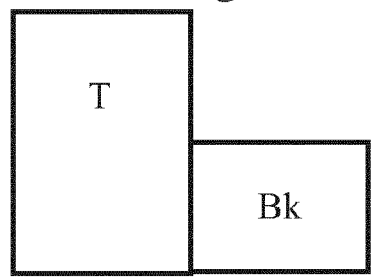

In FIG. 3b, the neighborhood comprises only two blocks located on the left of the current block Bk.

Figure 3C:
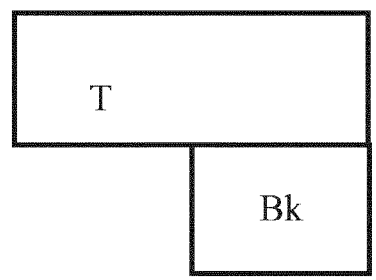
Figure 3D:
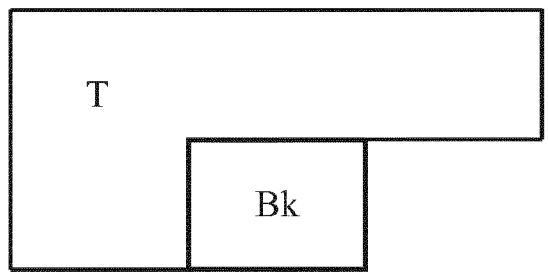

In FIG. 3c, the neighborhood comprises three blocks located on top of the current bloc Bk and in FIG. 3d, the neighborhood comprises four blocks: three on the top and one on left the current block Bk.

Other neighborhoods may be used by the invention which is not limited to these examples. The neighborhoods may have, for example, other shapes and/or sizes which may be defined independently of the number and/or size of blocks. The neighborhood is only limited to causal regions i.e. to regions the information of which is previously known by the apparatus which is in charge of compensating the illumination variations of a sequence of images. Causal regions allows a remote apparatus, such as a decoder in a coding scheme, to compute the mapping functions without any transmitted information sent by an encoder. This avoids a loss of the video coding efficiency.

The invention relates also to a method of coding and/or decoding a sequence of images computing a prediction block from a block of a reference image, characterised in that the prediction block is computed from a block of the reference image which is modified according to a method of compensating illumination variations which conforms to the invention.

Figure 4:
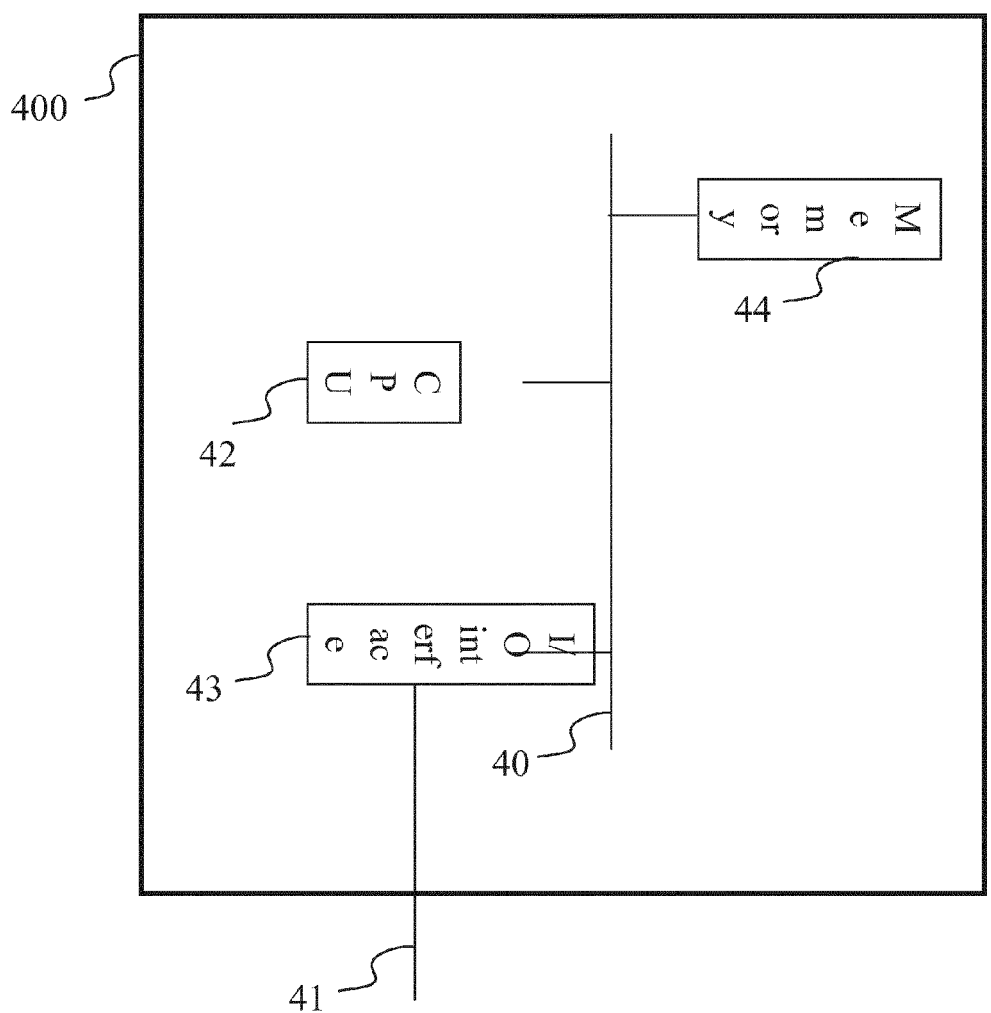
FIG. 4 shows an apparatus which comprises means configured to implement the method.

FIG. 4 shows an apparatus 400 which comprises means configured to implement the method. The apparatus comprises the following components, interconnected by a digital data- and address bus 40:

- a processing unit 42 (or CPU for Central Processing Unit);
- a memory 44;
- a network interface 43, for interconnection of device 400 to other devices connected in a network via wired or wireless connection 41.

Processing unit 42 can be implemented as a microprocessor, a custom chip, a dedicated (micro-) controller, and so on. Memory 44 can be implemented in any form of volatile and/or non-volatile memory, such as a RAM (Random Access Memory), hard disk drive, non-volatile random-access memory, EPROM (Erasable Programmable ROM), and so on. Device 400 is suited for implementing a data processing device according to the method of the invention. The data processing device 400 has means for defining a causal region as a neighborhood of a block of an image (42, 44 and/or 43); means for determining a distribution (for example a cumulative histogram) over a causal region of a block of an image (42, 44); means for computing a mapping between the pixel values of a block of a current image and the pixel values of a block of a reference image which is relative to the block of the current image by matching two distributions, one determined over a causal region of said block of the current image and the other one over a causal region of said block of the reference image (42,44). The distributions and the LUT may be temporally (or not) stored in 44.

According to an embodiment, the apparatus further comprises means (43) to emit and/or receive a signal the frame of which comprises information about a mapping between the pixel values of a block of a current image of a sequence of images and the pixel values of a block of a reference image which is relative to the block of the current image by matching two distributions, one determined over a causal region nearby said block of the current image and the other one over a causal region nearby said block of the reference image.

This information may also define a LUT built.

The invention relates to a device of encoding and/or decoding a sequence of images which is characterized in that it comprises an apparatus above-described.

According to a particular embodiment, the invention is entirely implemented in hardware, for example as a dedicated component (for example as an ASIC, FPGA or VLSI) (respectively «Application Specific Integrated Circuit», «Field-Programmable Gate Array» and «Very Large Scale Integration») or according to another variant embodiment, as distinct electronic components integrated in a device or, according to yet another embodiment, in a form of a mix of hardware and software.

The invention claimed is:

1. A method of compensating illumination variations in a sequence of images, wherein, for each current block of a current image from the sequence of images, the method comprising:
    determining a mapping function between the pixel values of said block of the current image and the pixel values of a block of a reference image from the sequence of images by matching a distribution of amplitude of pixels over a causal region surrounding said block of the current image and a distribution of amplitude of pixels over a causal region surrounding said block of the reference image.

2. The method according to the claim 1, wherein the distributions are cumulative histograms.

3. The method according to claim 1, wherein the current and reference images are the same image of the sequence of images.

4. The method according to claim 1, wherein the current and reference images are distinct images of the sequence of images.

5. The method according to claim 1, wherein the mapping results relative to at least one of said current block are stored in a look up table.

6. A method of coding and/or decoding a sequence of images comprising:
    computing a prediction block from a block of a reference image from the sequence of images, wherein the prediction block is computed from a block of the reference image which is modified according to a method of compensating illumination variations according to claim 1.

7. An apparatus for compensating illumination variations in a sequence of images which comprises a memory associated with a processor, said memory and processor configured to determine:
    a mapping function between pixel values of a block of a current image from the sequence of images and pixel values of a block of a reference image from the sequence of images, wherein said memory and processor are further configured to match a distribution of amplitude of pixels over a causal region surrounding said block of the current image and a distribution of amplitude pixels over a causal region surrounding said block of the reference image.

8. The apparatus according to claim 7, wherein the memory and processor are further configured:
    to send a signal and obtain, from said sent signal, an information about a mapping between the pixel values of a block of a current image from a sequence of images and the pixel values of a block of a reference image from the sequence of images obtained by matching two distributions, one computed over a causal region surrounding said block of the current image and the other one over a causal region surrounding said block of the reference image.

9. A device for encoding a sequence of images, comprising an apparatus comprising a memory associated with a processor, said memory and processor configured to send a signal and obtain, from said sent signal, an information about a mapping between pixel values of a block of a current image from a sequence of images and pixel values of a block of a reference image from the sequence of images obtained by matching two distributions, one computed over a causal region surrounding said block of the current image and the other one over a causal region surrounding said block of the reference image.

10. The apparatus according to claim 7, wherein said memory and processor are further configured to receive a signal and obtain, from said received signal, an information about a mapping between the pixel values of a block of a current image from a sequence of images and the pixel values of a block of a reference image from the sequence of images obtained by matching two distributions, one computed over a causal region surrounding said block of the current image and the other one over a causal region surrounding said block of the reference image.

11. A device for decoding a sequence of images, comprising a memory associated with a processor, said memory and processor configured to receive a signal and obtain, from said received signal, an information about a mapping between pixel values of a block of a current image from a sequence of images and pixel values of a block of a reference image from the sequence of images obtained by matching two distributions, one computed over a causal region surrounding said block of the current image and the other one over a causal region surrounding said block of the reference image.

* * * * *

UNITED STATES PATENT AND TRADEMARK OFFICE
CERTIFICATE OF CORRECTION

PATENT NO. : 9,870,606 B2
APPLICATION NO. : 14/429033
DATED : January 16, 2018
INVENTOR(S) : Philippe Bordes et al.

It is certified that error appears in the above-identified patent and that said Letters Patent is hereby corrected as shown below:

In the Specification

Column 1, Line 28:
Delete "etc. . . . ." and insert --etc.--.

In the Claims

Column 7, Line 6, in Claim 1:
After "between" delete "the".

Column 7, Line 7, in Claim 1:
After "and" delete "the".

Signed and Sealed this
Seventh Day of February, 2023

Katherine Kelly Vidal
*Director of the United States Patent and Trademark Office*